(12) United States Patent
Uno et al.

(10) Patent No.: US 8,218,233 B2
(45) Date of Patent: Jul. 10, 2012

(54) LIGHT SOURCE OPTICAL SYSTEM

(75) Inventors: Kanae Uno, Shibuya-Ku (JP); Kazunari Hanano, Shibuya-Ku (JP)

(73) Assignee: Olympus Medical Systems Corp., Tokyo (JP)

( * ) Notice: Subject to any disclaimer, the term of this patent is extended or adjusted under 35 U.S.C. 154(b) by 501 days.

(21) Appl. No.: 12/485,887

(22) Filed: Jun. 16, 2009

(65) Prior Publication Data

US 2009/0310211 A1  Dec. 17, 2009

(30) Foreign Application Priority Data

Jun. 17, 2008 (JP) ................. 2008-157596

(51) Int. Cl.
  *G02B 5/20* (2006.01)
  *G02B 23/00* (2006.01)
(52) U.S. Cl. .............. 359/361; 359/432; 359/723
(58) Field of Classification Search .......... 359/350, 359/385, 708, 723, 726–728, 73, 738, 361, 359/380, 432, 739; 362/552, 217.06, 299, 362/301–303; 385/33
See application file for complete search history.

(56) References Cited

U.S. PATENT DOCUMENTS

| | | | | |
|---|---|---|---|---|
| 5,680,257 A | * | 10/1997 | Anderson | 359/727 |
| 2005/0231799 A1 | * | 10/2005 | Kawasaki et al. | 359/385 |
| 2007/0253056 A1 | * | 11/2007 | Tanemura et al. | 359/363 |

FOREIGN PATENT DOCUMENTS

| | | |
|---|---|---|
| JP | H01-144009 A | 9/1989 |
| JP | H07-303604 A | 11/1995 |
| JP | 2001-083435 A | 3/2001 |
| JP | 2005-342034 A | 12/2005 |

* cited by examiner

*Primary Examiner* — Frank Font
(74) *Attorney, Agent, or Firm* — Aaron International; Bruce Y. Arnold

(57) ABSTRACT

The invention relates to a light source optical system for endoscopes which is compatible with various viewing modes, prevents an associated light source apparatus from growing bulky, and makes sure brightness. The light source optical system comprises, in order from the light source 1, the collective optical system 2 for collecting light from the light source, the magnification conversion optical system 3 for reducing a pupil magnification, and the positive lens group 4 for collecting light from the magnification conversion optical system 3, and satisfies Condition (1) with respect to the principal point-to-point distance d of the collective optical system 2 and magnification conversion optical system 3, the rear focal length $f_{2B}$ of the collective optical system 2 and the front focal length $f_{3F}$ of the magnification conversion optical system 3.

7 Claims, 10 Drawing Sheets

LIGHT SOURCE OPTICAL SYSTEM

BACKGROUND OF THE INVENTION

The present invention relates generally to a light source optical system, and more particularly to a light guide illumination apparatus for endoscopes.

As already well known in the art, the color imaging mode for electronic scopes generally includes the "mosaic filter mode" and the "field sequential illumination mode". In the mosaic filter mode, a solid-state image pickup device with a color filter formed per pixel is used on an imaging plane to obtain color images by white illumination. In the field sequential mode, on the other hand, a black-and-white solid-state image pickup device is used, and color filters for R, G, B, etc. are mounted in a light source apparatus that is an illumination means to time-divide illumination light thereby obtaining color images.

The former allocates colors to the limited number of pixels; so it is lower in resolving power than the latter using a monochromatic solid-state image pickup device, and renders it difficult to control color reproduction because the color filters are on the imaging plane of the image pickup device. The latter enables color reproduction to be controlled by altering the characteristics of the color filters mounted in the light source apparatus, and makes better color reproduction possible.

For the color filters located in the light source apparatus operating in the field sequential mode, the interference type is generally used. With this interference type filters, there is a change in the transmittance (reflectance) characteristics depending on the angle of incidence of light rays. For instance, when it comes to a filter designed such that the desired characteristics are obtained at the angle of incidence of 0°, the larger the angle of incidence, the more the transmitted wavelength shifts or ripples to a short wavelength side and the more of deviation there is from the desired characteristics with the result that color reproduction goes worse. To obtain the desired characteristics with the interference type filters yet with high precision, it is necessary to keep the angle of incidence from growing wide: this requirement is an imperative challenge to designing light source optical systems.

A typical light source optical system of the field sequential illumination mode with color filters located in it is set forth in Patent Publication 1. In this light source optical system, as shown in FIG. 8, light emanating from a light source 1 is somewhat moderately collected by a front unit 2a of a collective lens system 2, entering a filter 5. The light is then collected by a rear unit 2b of the collective lens system 2, entering the entrance end surface of a light guide 6.

Such arrangement has some defects: it renders it difficult to diminish the diameter of light beams on the color filter surface, resulting in a bulky filter size and thus an increase in the size of the light source optical system. In addition, the angle of incidence of light onto the filters is wide with the result that color reproduction becomes inferior due to the above change in the angle-of-incidence characteristics.

On the other hand, a typical optical system of the field sequential illumination mode—which takes care of the angle of incidence of light rays onto the interference type color filters—is set forth in Patent Publication 2. As shown in FIG. 9(A), this optical system is built up of a collective optical system 2 for collecting parallel light beams emanating from a light source 1, a magnification conversion optical system 3 for reducing the diameter of light beams after passing through the collective optical system 2, and a positive lens group 4 that is located on an entrance end surface side of a light guide 6 with respect to the magnification conversion optical system 3 and collects light from the magnification conversion optical system 3 onto the entrance end surface of the light guide 6, with a color filter 5 interposed between the magnification conversion optical system 3 and the positive lens group 4. With the optical system of such arrangement, the parallel light beams from the light source 1 are subjected to magnification conversion into reduced, substantially parallel light beams. It is thus possible not only to diminish the diameter of light beams onto an interference coating surface thereby reducing apparatus size but also to keep the angle of incidence from growing wide thereby achieving satisfactory color reproduction. When a monochromatic, full-frame transfer type CCD is employed, use is often made of a color wheel 10 comprising R, G and B color filters 11R, 11G and 11B and a light block plate 12 for controlling exposure and light blocking. With this color wheel it is possible to improve brightness more because the smaller the diameter of light beams at that wheel position, the higher the efficiency of light use becomes.

In recent years, in addition to general viewing in three colors: RGB, there have been new viewing methods developed as represented by the AFI method for viewing the in vivo self-fluorescence, the NBI method for irradiating blood vessels with narrow band light to view blood vessel images in high contrasts, etc., and their effectiveness has been reported as well. With new such viewing methods, images are obtained by irradiation with the desired illumination light in combinations of color filters. If various viewing methods can be implemented with a single light source apparatus, it is unnecessary to get one dedicated light source apparatus ready for each viewing method, offering greater user merits.

To be compatible with various viewing methods using a single light source apparatus, color filters dedicated to each viewing method must be mounted in an associated light source optical system: as color filter space grows wider, it allows for more color filters well fit for many viewing methods.

For the optical system of FIG. 9(A), it is preferable to make sure a longer distance between the magnification conversion optical system 3 with the color filter 5 mounted in it and the positive lens group 4. However, making this distance much longer offers a problem that the quantity of incident light decreases, because, as shown in FIG. 9(B), off-axis light rays at the positive lens group 4 gains some height, rendering it difficult to increase the aperture of the positive lens group 4, and to correct aberrations for the purpose of making light incident onto an optical fiber forming the light guide 6.

Patent Publication 1: JP(A) 7-303604
Patent Publication 2: Patent No. 2826315

SUMMARY OF THE INVENTION

Having been made with such problems as mentioned above in mind, the present invention has for its object to provide a light source optical system that is compatible with various viewing methods, prevents an associated light source apparatus from getting bulky, and makes sure brightness.

According to the invention, the above object is accomplishable by the provision of a light source optical system comprising, in order from a light source, a collective optical system for collecting light from the light source, a magnification conversion optical system for reducing a pupil magnification, and a positive lens group for collecting light from said magnification conversion optical system, characterized by satisfying the following condition (1):

$$d < f_{2B} + f_{3F} < d + f_{3F} \qquad (1)$$

where d is the principal point-to-point distance of said collective optical system and said magnification conversion optical system, $f_{2B}$ is the rear focal length of said collective optical system, and $f_{3F}$ is the front focal length of said magnification optical system.

The light source optical system of the invention is further characterized by satisfying the following condition (2) with respect to the focal length of said positive lens group for collecting light from said magnification conversion optical system.

$$0.5/h_4 < 1/f_4 < 1/x + 2/h_4 \quad (2)$$

Here $f_4$ is the focal length of said positive lens group, $h_4$ is the height of light rays at a chief plane of said positive lens group, and x is the principal point-to-point distance of said magnification conversion optical system and said positive lens group.

The light source optical system of the invention is further characterized in that said positive lens group for collecting light from said magnification conversion optical system comprises at least two lenses, and satisfies the following condition (3):

$$n_{4b} \geq n_{4i} \quad (3)$$

where $n_{4b}$ is the refractive index of a lens located in said positive lens group and on a light source side, and $n_{4i}$ is the refractive index of a lens located in said positive lens group and on an exit side.

The invention also provides a light source optical system comprising, in order from a light source side, a collective optical system for collecting light from the light source, a magnification conversion optical system for reducing a pupil magnification, and a positive lens group for collecting light from said magnification conversion optical system, characterized in that an achromatic lens is located between said light source and said collective optical system.

The requirements for, and the advantages of, the above light source optical systems of the invention are now explained.

FIG. 1 is illustrative of the basic arrangement of the inventive light source optical system for endoscopes. In FIG. 1, reference numeral 1 is a light source comprising a reflector 1a and a light source lamp 1b located substantially at the focal position of the reflector; 2 is a collective lens system (collective optical system) for collecting light emanating from the light source 1; 3 is a magnification conversion optical system for reducing the diameter of a light beam after passing through the collective lens system 2; 4 is a positive lens group that is located on an object side with respect to the magnification conversion optical system 3 for collecting and guiding light from the magnification conversion optical system 3 to a light guide 6; and 5 is a color wheel that is located between the magnification conversion optical system 3 and the positive lens group 4, and comprises a plurality of color filters.

To accomplish the object of the invention, the inventive light source optical system for endoscopes should be configured in such a way as to satisfy the following condition (1).

$$d < f_{2B} + f_{3F} < d + f_{3F} \quad (1)$$

Here d is the principal point-to-point distance of the collective optical system 2 and the magnification conversion optical system 3, $f_{2B}$ is the rear focal length of the collective optical system 2, and $f_{3F}$ is the front focal length of the magnification conversion optical system 3.

At the lower limit to Condition (1), i.e., when the rear focal length position of the collective lens system 2 is in coincidence with the front focal length position of the magnification conversion optical system 3, the optical system here provides an ideal afocal system. When, as indicated by a broken line in FIG. 2, the principal point-to-point distance d of the collective lens system 2 and the magnification conversion optical system 3 is less than the sum of the rear focal length $f_{2B}$ of the collective lens system 2 and the front focal length $f_{3F}$ of the magnification conversion optical system 3, i.e., when the left side of Condition (1) is satisfied, it is then possible to locate the color filters 5 at a position where the diameter of a light beam is smaller than that of a parallel light beam between the magnification conversion optical system 3 and the positive lens group 4 in such an optical system as to satisfy the lower limit to Condition (1) as indicated by a solid line in FIG. 2. It is thus possible to reduce the size of the color filters 5 and color wheel.

On the other hand, when the sum of the focal lengths of the collective lens system 2 and magnification conversion optical system 3 exceeds the upper limit to Condition (1) (that is, the position where the rear focal length position of the collective lens system 2 is coincidence with the front principal point position of the magnification conversion optical system 3), the light converged by the collective lens system 2 will spread out after passing through the magnification conversion optical system 3. Then, the angle of incidence of light rays onto the color filters 5 will grow wide, giving rise to deterioration in color reproduction. For this reason, the sum of the focal lengths of the collective lens system (collective optical system) 2 and magnification conversion optical system 3 must be less than the upper limit to Condition (1).

To diminish the incident light beam with Condition (1) satisfied by the optical system, it is preferable that the color wheel is located at a position near to the magnification conversion optical system 3. It is then preferable that a light block plate is located more on the light source side than the color filters 5, because exposure and light blocking are implemented with a more reduced light beam diameter so that the efficiency of light use can be much more improved.

In the optical system that satisfies Condition (1), the range of the focal length of the positive lens group 4 for allowing light rays passing through the magnification conversion optical system 4 to be efficiently incident onto the light guide 6 is determined by the following condition (2).

$$0.5/h_4 < 1/f_4 < 1/x + 2/h_4 \quad (2)$$

Here $f_4$ is the focal length of the positive lens group 4, $h_4$ is the height of light rays at the chief plane of the positive lens group 4, and x is the principal point-to-point distance of the magnification conversion optical system 3 and positive lens group 4.

Condition (2) is provided to limit the focal length of the positive lens group 4 so that in the optical system that satisfies Condition (1), the range of the angle of incidence of light rays onto the light guide 6 is determined.

At the lower limit to Condition (1), i.e., when the rear focal length position of the collective optical system 2 is in coincidence with the front focal length position of the magnification conversion optical system 3, and when it is intended to make light rays incident at less than the NA (assumed to be equal to sinu) of the light guide 6, the focal length $f_4$ of the positive lens group 4 satisfies:

$$1/f_4 = (\tan u)/h_4$$

where $h_4$ is the height of light rays at the chief plane of the positive lens group 4.

On the other hand, the case where the upper limit to Condition (1) is satisfied, i.e., the case where the focal length position of the collective optical system 2 is in coincidence with the front principal point position of the magnification conversion optical system 3 is shown in FIG. 3. When it is intended to make light rays incident at less than the NA (assumed to be equal to sinu) of the light guide 6, the focal length $f_4$ of the positive lens group 4 satisfies:

$$1/f_4 = (\tan u)/h_4 + 1/x$$

where x is the principal point-to-point distance of the magnification conversion optical system 3 and the positive lens group 4, and $h_4$ is the height of light rays at the chief plane of the positive lens group 4.

To make light rays incident at less than the NA of the light guide 6 in the optical system in which the collective optical system 2 and the magnification conversion optical system 3 satisfy Condition (1), the focal length $f_4$ of the positive lens group 4 must satisfy:

$$(\tan u)/h_4 < 1/f_4 < (\tan u)/h_4 + 1/x$$

In consideration of the efficiency of transmission of light quantity and the distribution of light over a viewing plane, the NA of the light guide 6 should preferably be in the range of 0.5 to 0.9. From the above condition, therefore, it is found that given Condition (2):

$$0.5/h_4 < 1/f_4 < 1/x + 2/h_4 \quad (2)$$

light rays passing through the optical system here could be efficiently incident onto the light guide 6.

In an optical system short of the lower limit of $0.5/h_4$ to Condition (2), light rays passing through the magnification conversion optical system 3 will spread out and incident onto the positive lens group 4: if the positive lens group 4 has a lens arrangement consisting of one lens, it is difficult to gather light onto the end surface of the light guide 6, because its power is weak. It is therefore preferable that at least two lenses are used in the positive lens group 4.

As shown in FIG. 1, the height of light rays incident onto the light source-side lens 4a in the positive lens group 4 is greater than that at the exit-side lens 4b. Here, when a low-refractive-index vitreous material is used for the lens 4a located in the positive lens group 4 and more on the light source side, the radius of curvature of that lens 4a must be small to gather light to the end surface of the light guide 6. However, light rays incident onto the light source-side lens 4a are high, and to prevent that lens 4a from breaking off at the edge, it must have a greater thickness. This is not preferable in view of not only optical performance considerations such as total reflection but cost as well. Therefore, it is preferable that the lens 4a located in the positive lens group 4 and more on the light source side is formed of a vitreous material having a refractive index higher than that of the exit-side lens 4b. That is, it is desired to satisfy Condition (3):

$$n_{4b} \geq n_{4i} \quad (3)$$

Such a light source optical system as depicted in FIG. 4 comprises a plurality of lenses, each having large positive power, and so has an extremely strong convex power as a whole, causing chromatic aberrations to occur more. In the light source optical system of the invention, an achromatic lens 2a is interposed between the light source 1 and the collective lens 2b in the collective optical system 2 so that there is stabilized image quality achievable with reduced or minimized chromatic aberrations.

Such a light source optical system is small in terms of the angle of light emanating from the light source 1 and large in terms of the NA of light incident onto the light guide 6, and so it is preferable that a vitreous material having a combination of high refractive index and high dispersion, and a combination of low refractive index and low dispersion to hold back spherical aberrations is used for the achromatic lens 2a.

It should be noted that if the achromatic lens 2a is located with its convex surface lying on the light source side as shown in FIG. 1, the size of the collective lens 2a can then be reduced by lowering the height of on-axis light rays after passing through the achromatic lens 2a. When the achromatic lens 2a is located with its convex surface lying on the exit side, on the other hand, on-axis and off-axis light rays after passing through the achromatic lens can be well separated at the lens surface of the collective lens 2b in terms of height. Accordingly, when an aspheric lens is used for the collective lens 2b, there is a merit obtained that correction of aberrations is facilitated by aspheric design. Taking advantage of such features, it is preferable to determine the orientation of the convex surface of the achromatic lens depending on what purpose and specifications the light source is used for and in.

It is then preferable to satisfy:

$$f_c/f_2 \approx 0$$

where $f_c$ is the composite focal length of the achromatic lens, and $f_2$ is the focal length of the collective optical system, because the whole power distribution of the optical system remains invariable even when the achromatic lens is removed off; in other words, it may be removed off whenever unnecessary.

Referring to how to hold back chromatic aberrations, there is just only a method of holding back chromatic aberrations on the image plane of the light source optical system, i.e., the entrance surface of the light guide but also a method of holding back them on another surface. To make sure the dynamic range of an imaging device in an electronic scope in an endoscope system, such a blade stop 13 as shown in FIG. 11 is used in the light source optical system to implement light control (light quantity control) depending on the state of illumination (positional relations between the scope and the site to be illuminated, etc.), and if the chromatic aberrations of light are held back on the surface where the blade stop 13 is located, it is then possible to provide stabilized image quality irrespective of light control levels.

Further in the light source optical system of the invention, it is preferable that, as shown in FIG. 4, a reflection type infrared cut filter 7 located between the light source 1 and the collective optical system 2 satisfies the following condition, and an absorption type infrared filter 8 is located with the filter surface lying in the direction vertical to an optical axis.

$$\theta \geq \tan^{-1}\{D/(2L)\} \quad (4)$$

where θ is the angle of the reflection type infrared cut filter 7 with the direction vertical to the optical axis, D is the pupil diameter of the light source lamp that forms the light source, and L is the distance from the pupil position of the light source lamp up to the surface of the reflection type infrared cut filter 7.

If the reflection type infrared cut filter 7 is located in such a way as to satisfy Condition (4), light rays do hardly enter the light source 1 even when parallel light emanating from the light source 1 is reflected at the surface of the infrared cut filter 7, resulting in prevention of deterioration of the light source. The absorption type infrared cut filter 8 is mounted in a pre-divided form so as to keep it from breaking due to the absorption of infrared radiation. Note here that the absorption type infrared cut filter 8 is all sand polished on the sides, and as light strikes there, there is scattering. If that filter is on the tilt, light strikes upon the sides of the cracks; in other words, that filter should be located vertically to the optical axis.

If the reflection or absorption type infrared cut filter is used in such arrangement, it can then be used safely without incurring inconveniences due to heat even in an endoscope light source where large quantities of light are projected.

According to the invention as described above, there can be a light source optical system for endoscopes provided that is compatible with various viewing methods, prevents an associated light source apparatus from getting bulky, makes sure brightness, and is less susceptible to color changes.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
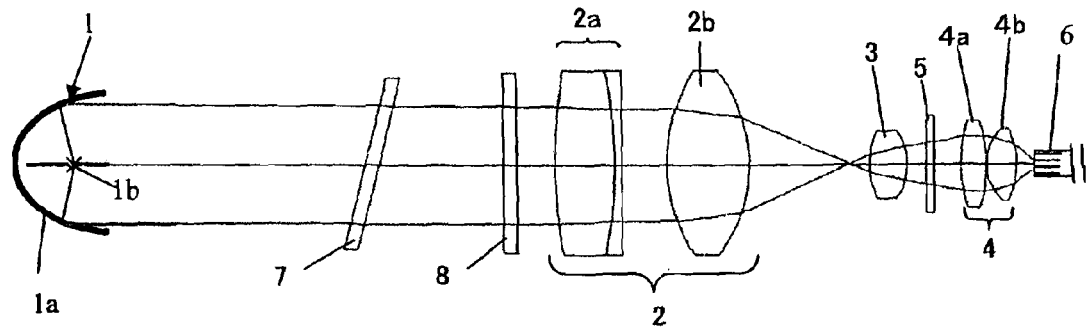
FIG. 1 is illustrative of the basic arrangement of the light source optical system for endoscopes according to the invention.
Figure 2:
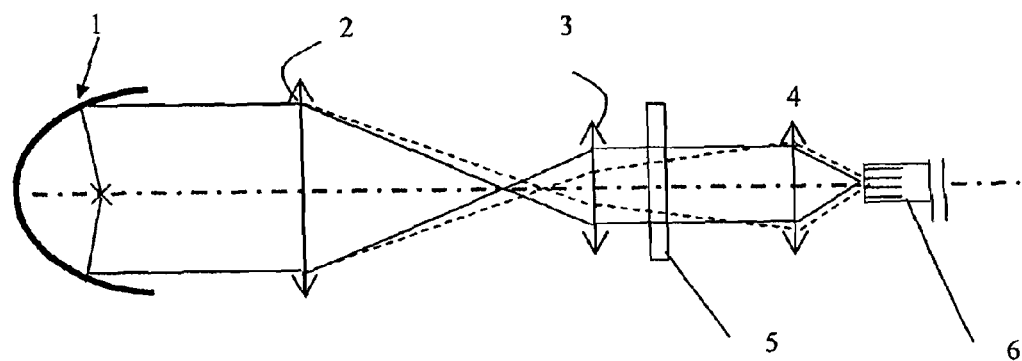
FIG. 2 is illustrative of the diameter of a light beam at the lower limit to Condition (1) and when the left side of Condition (1) is satisfied.
Figure 3:
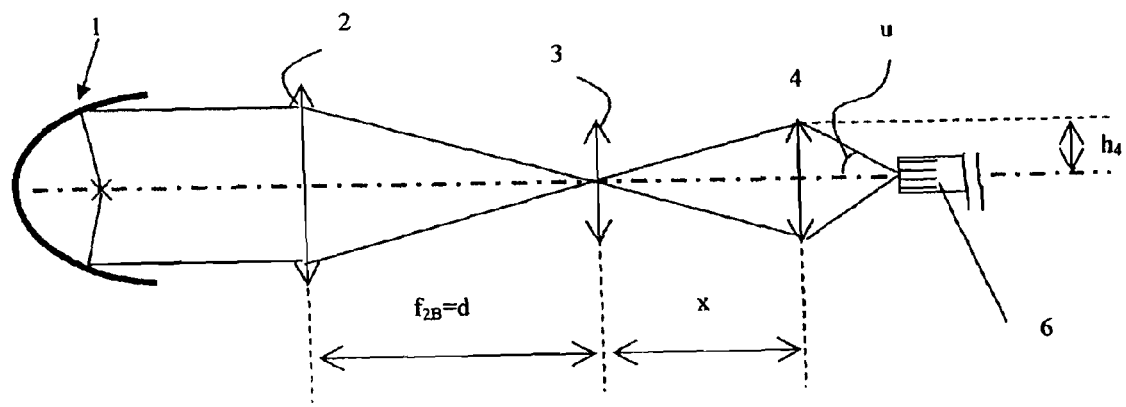
FIG. 3 is illustrative of the case where the rear focal position of the collective optical system is in coincidence with the front principal point position of the magnification conversion optical system.
Figure 4:
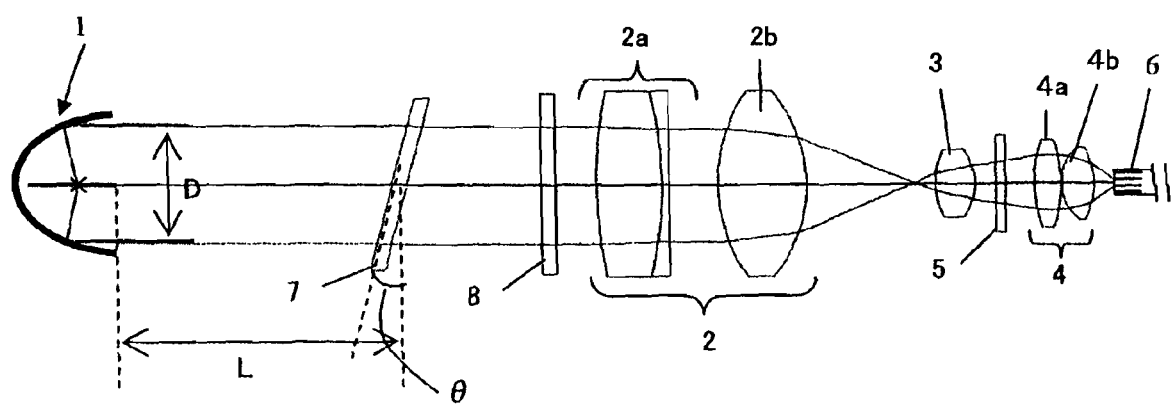
FIG. 4 is illustrative of the angle of the reflection type infrared cut filter interposed between the light source and the collective optical system with the direction vertical to the optical axis.
Figure 5:
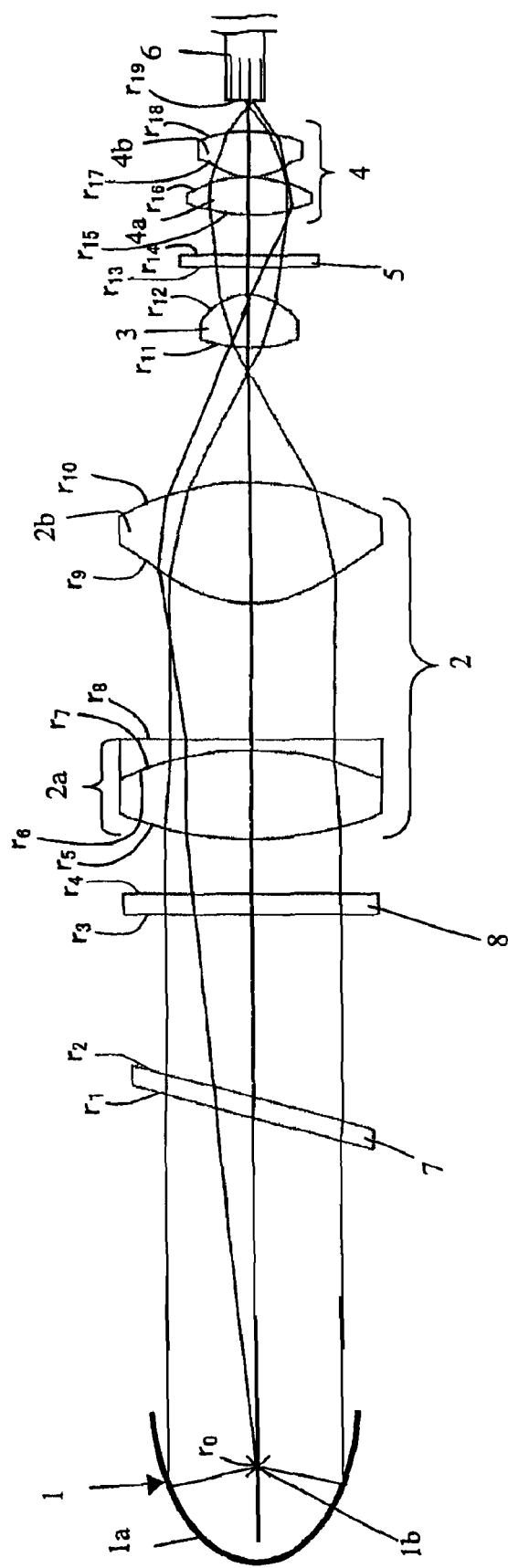
FIG. 5 is illustrative in section through the optical axis of Example 1 of the light source optical system for endoscopes according to the invention.
Figure 6:
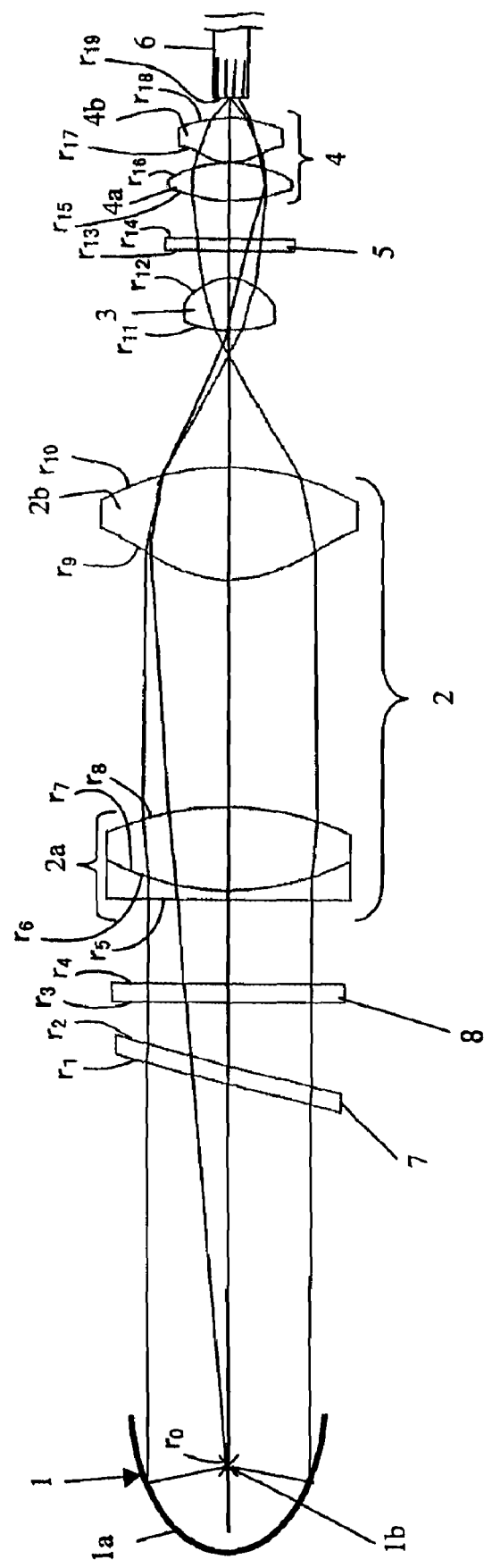
FIG. 6 is illustrative in section through the optical axis of Example 2 of the light source optical system for endoscopes according to the invention.

Sectional views through the optical axis of Examples 1 and 2 of the inventive light source optical system for endoscopes are presented in FIGS. 5 and 6.

Numerical data of the lens systems in Examples 1 and 2 will be given later. In Examples 1 and 2, "No", "r", "d", "ne", "vd" and "ED" are indicative of an optical surface number as counted from the light source side, a radius of curvature, a surface-to-surface or air space, an e-line refractive index, an Abbe constant, and an effective diameter, respectively. The radius of curvature, surface-to-surface space and effective diameter are given in mm.

In FIGS. 5 and 6, surface Nos. 0, 1, 2, 3, . . . are indicated by $r_0, r_1, r_2, r_3, \ldots$ (surface No. 0 is the light source), and the effective diameter of the light source (surface No. 0) is indicated by the entrance pupil diameter of the light source.

Aspheric surface shape is given by the following formula, provided that the Z-axis is defined by an optical axis direction, and the Y-axis is defined by the direction vertical to the optical axis.

$$Z = CY^2/[1+\sqrt{\{1-(1+K)C^2Y^2\}}] + A_4Y^4 + A_6Y^6 + A_8Y^8 + A_{10}Y^{10} + A_{12}Y^{12} + \quad \text{(a)}$$

where C is the curvature of the aspheric surface at the vertex ($=1/r$ where r is the radius of curvature), K is a conic coefficient, and $A_4$, $A_6$, $A_8$, $A_{10}$ and $A_{12}$ are the fourth-, sixth-, eighth-, tenth- and twelfth-order aspheric coefficients.

In the data given later, "E–nm where n and m are each an integer means "$\times 10^{-nm}$".

In Example 1, and 2, light emanating from a light source 1 comprising a reflector 1a formed of paraboloid and a light source lamp 1b located substantially at the focal position thereof is collected by a collective optical system 2 comprising an achromatic lens 2a and a collective lens 2b, after which the light passes through a magnification conversion optical system 3 where a pupil is reduced, and then through a rotary filter 5. The light from the magnification conversion optical system 3 is collected through a positive lens group 4 onto a light guide 6 (the 19$^{th}$ surface).

A reflection type infrared cut filter 7 and an absorption type infrared cut filter 8 are interposed between the light source 1 and the collective optical system 2. More specifically, a surface of the reflection type infrared cut filter 7 is tilted from the direction perpendicular to the optical axis, and the absorption type infrared cut filter 8 has a surface that is perpendicular to the optical axis.

The magnification conversion optical system 3 is made up of one aspheric lens having positive power, and the positive lens group 4 after the rotary filter 5 is made up of a spherical lens 4a and an aspheric lens 4b.

In Example 1, the collective optical system 2 is made up of an achromatic lens 2a with the convex surface lying on the light source 1 side and an aspheric lens 2b. By lowering the height of on-axis light rays after passing through the achromatic lens 2a, the size of the aspheric lens 2b can be diminished.

In Example 2, the collective optical system 2 is made up of an achromatic lens 2a with the convex surface lying on the light guide 6 side and an aspheric lens 2b. On-axis and off-axis light rays after passing through the achromatic lens 2a are well separated in height on the lens surface of the aspheric lens 2b, offering a merit that correction of aberrations is facilitated by aspheric design.

Referring further to Examples 1 and 2, the first and second surfaces in the data described later are the reflection type infrared cut filter 7 that is located at a tilt of 15° from the direction vertical to the optical axis, and the third and fourth surfaces are the absorption type infrared cut filter 8 that is located vertically to the optical axis.

Referring further to Examples 1 and 2, the exit side surface (the ninth surface) of the collective lens 2b, the exit side surface (the twelfth surface) of the aspheric lens that is the magnification conversion optical system 3, and the entrance side surface (the seventeenth surface) of the aspheric lens 4b in the positive lens group 4 is made up of an aspheric surface represented by the aforesaid formula (a).

In Example 3 that is a modification to Example 1, there are the lens data of the optical system given, wherein chromatic aberrations on the surface of the blade stop are held back.

Figure 11:
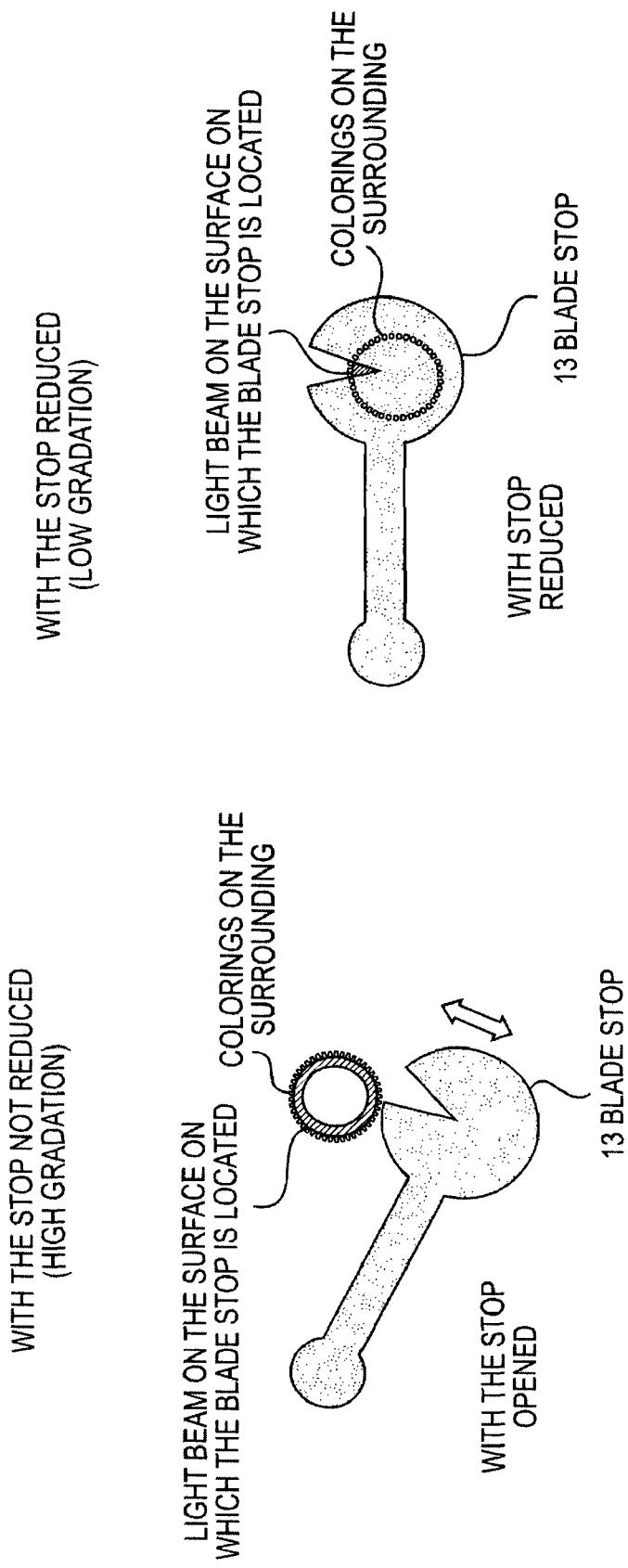
FIG. 11 is illustrative of light quantity control by a blade stop.
Figure 12:
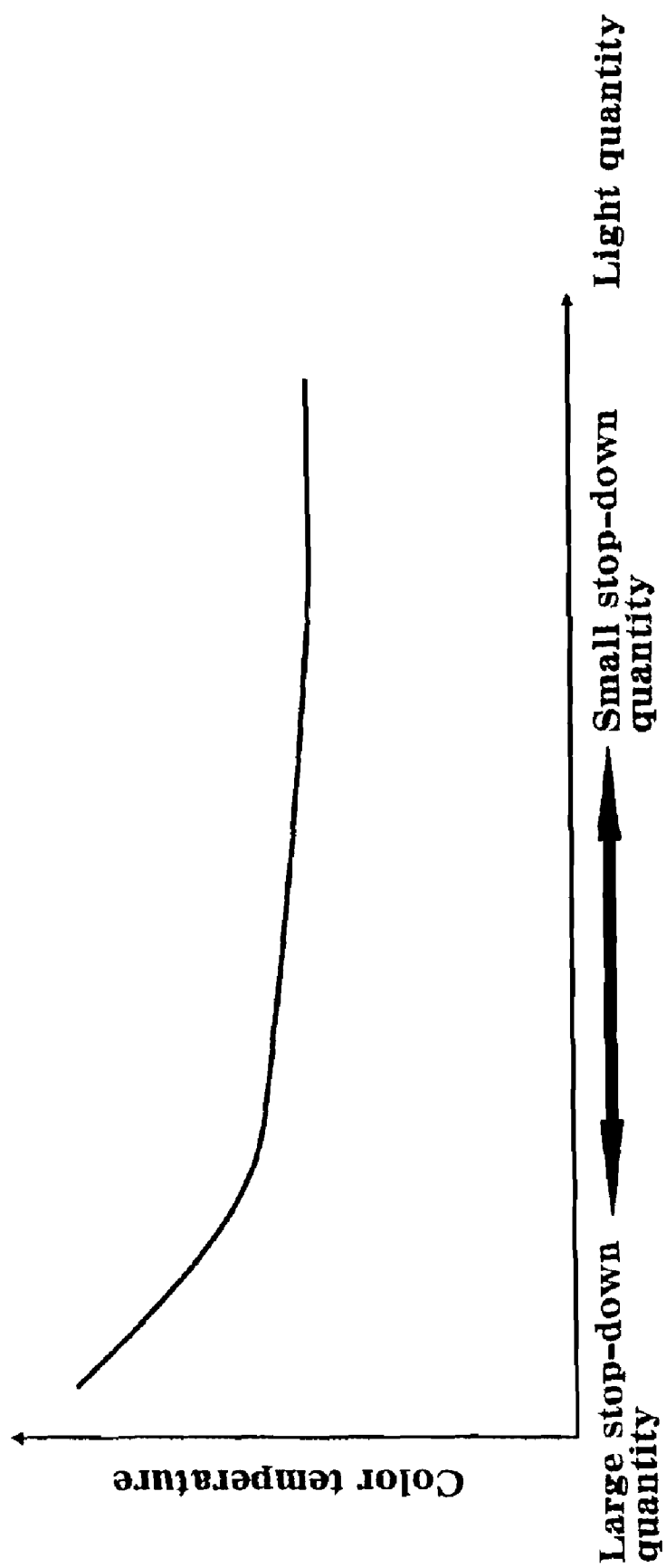
FIG. 12 is illustrative of one exemplary relationship between stop-down quantity and chromatic temperature when the blade stop is opened or closed.

Light quantity control (light control) by the blade stop is shown in FIGS. 11(A) and 11(B), and shown in FIG. 12 is a graph of one exemplary relationship between stop-down quantity and color temperature when the blade stop 13 shown in FIG. 11 is opened or closed. If there is a color distribution on a light beam on the blade stop surface (FIG. 11(A) shows that there is a coloring around the light beam due to the chromatic aberrations of the optical system, and FIG. 11(B) shows that with the blade stop reduced, that coloring prevails), there is then a color temperature change depending on the stop-down quantity. Accordingly, the quantity of color separation of light lays on the surface of the blade stop 13, for instance, should preferably be reduced in consideration of the light beam diameter and the shape of the blade stop 13.

Figure 13A:
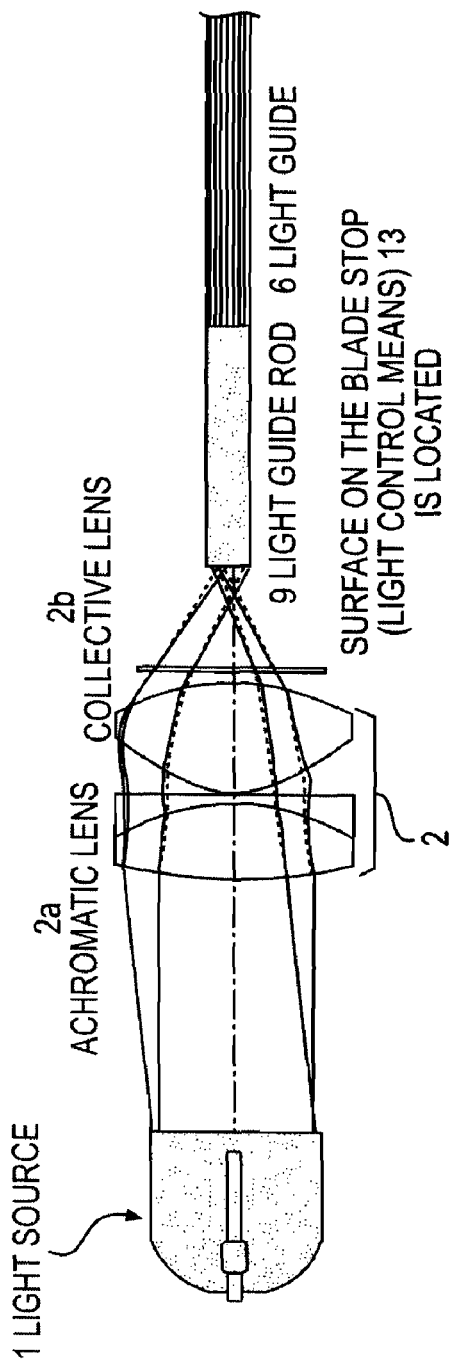
FIG. 13 is illustrative in conception of correction of chromatic aberrations on the blade stop surface and the light guide surface.
Figure 13B:
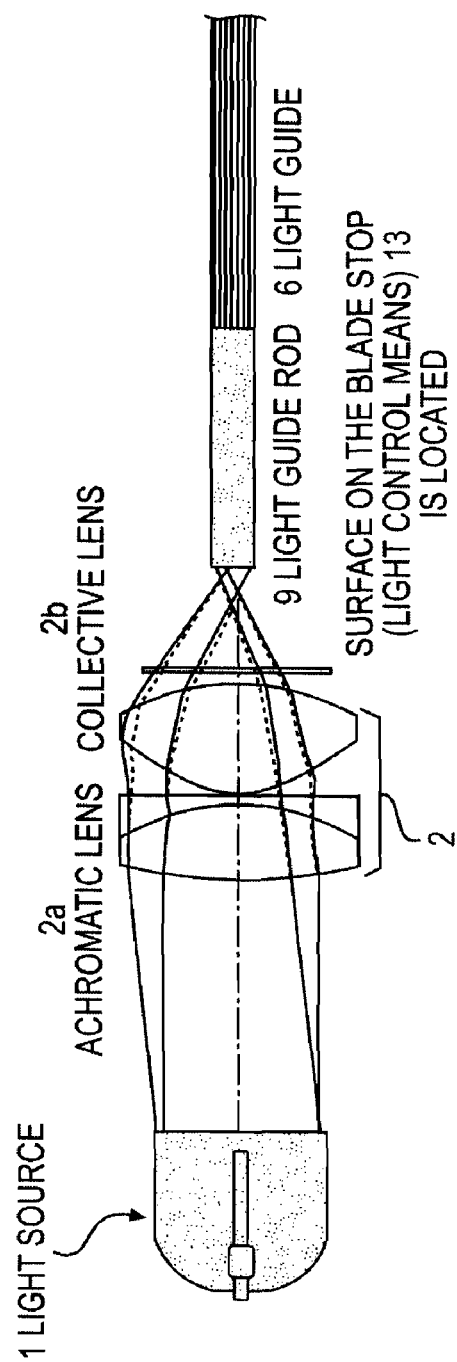

FIG. 13 is illustrative in conception of correction of chromatic aberrations on the blade stop surface. More specifically, FIG. 13(A) is illustrative in conception of an optical path taken per color, and FIG. 13(B) is illustrative of how chromatic aberrations on the light guide surface are held back. For the sake of simplification, the collective lens 2b is shown in the form of one lens. Note here that a light guidance rod 9 is located at the entrance end of the light guide 6.

As described above, if the color distribution of the light beam on the blade stop surface is limited, then the color change due to the stop-down quantity is kept small. However, it is desired to hold back chromatic aberrations in consideration of the angle dependence of the spectral transmittance of an optical fiber. Even with a stop having shape other than that of the blade stop shown in FIG. 11, especially with a stop basically configured in such a way as to shade light beams, the angular distribution of light incident onto optical fibers often changes depending on the stop-down quantity with the result that there are color changes caused by the angle dependence of the spectral transmittance of optical fibers. If chromatic aberrations are corrected such that the color distribution of the light beam on the blade stop surface cancels out such color changes, that would be preferable because the color changes are held back throughout the system.

A complement to the above angle dependence of spectral transmittance of optical fibers and the color distribution of light beams on the blade stop surface may be necessary because they are not shown in the drawings. For instance, assume that the spectral transmittance of optical fibers is such that as the angle of incident light grows large, it causes the red component to decrease (the blue component to increase relatively). With an increasing stop-down quantity, the angle distribution of incident light onto optical fibers grows predominantly wide or the blue component increases. In that case, if the color distribution in an area—where light is not shaded when there is a large stop-down quantity (there is a large quantity of shading)—turns red, it is then possible to hold back the color change of illumination light guided through the optical fibers.

Set out below are the numerical data in Examples 1, 2 and 3.

EXAMPLE 1

| No | r | d | ne | vd | ED |
|---|---|---|---|---|---|
| 0 | ∞ | 57.04 | | | 25.4 |
| 1 | ∞ | 3 | 1.5251 | 58.58 | 36.3 |
| 2 | ∞ | 27.3 | | | 36.3 |
| 3 | ∞ | 3 | 1.4731 | 66.5 | 37 |
| 4 | ∞ | 7.99 | | | 37 |
| 5 | 50.682 | 13 | 1.48915 | 70.23 | 38 |
| 6 | −43.27 | 0.01 | | | 38 |
| 7 | −43.27 | 1.5 | 1.93429 | 18.9 | 38 |
| 8 | ∞ | 20.5 | | | 38 |
| 9 | 16.785 | 18 | 1.51825 | 64.06 | 38 |
| 10 | −37.545 | 19.94 | | | 38 |
| 11 | 21.764 | 8 | 1.51825 | 64.06 | 14 |
| 12 | −5.849 | 4.16 | | | 14 |
| 13 | ∞ | 1.8 | 1.5251 | 58.58 | |
| 14 | ∞ | 6.04 | | | |
| 15 | 24.03 | 5.5 | 1.69661 | 53.21 | 18 |
| 16 | −18.006 | 0.1 | | | 18 |
| 17 | 7.501 | 6.5 | 1.51825 | 64.06 | 15 |
| 18 | −19.566 | 4.72 | | | |
| 19 | ∞ | | | | |

Data of aspherical surfaces

9th surface $K = -1$
$A_4 = -1.26E-06$
$A_6 = -1.60E-08$
$A_8 = -1.00E-10$
$A_{10} = 5.37E-14$
$A_{12} = 1.68E-16$ 12th surface $K = -1$
$A_4 = 1.90E-04$
$A_6 = 1.30E-06$
$A_8 = 2.54E-08$
$A_{10} = -1.78E-09$
$A_{12} = -2.44E-11$ 17th surface $K = -1$
$A_4 = 9.44E-06$
$A_6 = -3.25E-06$
$A_8 = -1.36E-07$
$A_{10} = 2.88E-10$
$A_{12} = 1.74E-11$

EXAMPLE 2

| No | r | d | ne | vd | ED |
|---|---|---|---|---|---|
| 0 | ∞ | 57.04 | | | 25.4 |
| 1 | ∞ | 3 | 1.5251 | 58.58 | 36.3 |
| 2 | ∞ | 10 | | | 36.3 |
| 3 | ∞ | 3 | 1.4731 | 66.5 | 36.3 |
| 4 | ∞ | 13.29 | | | 36.3 |
| 5 | ∞ | 1.5 | 1.93429 | 18.9 | 38 |
| 6 | 42 | 0.01 | | | 38 |
| 7 | 42 | 13 | 1.48915 | 70.23 | 38 |
| 8 | −45 | 35.5 | | | 38 |
| 9 | 19.3662 | 18 | 1.51825 | 64.06 | 40 |
| 10 | −37.7887 | 21.94 | | | 40 |
| 11 | 21.764 | 8 | 1.51825 | 64.06 | 14 |
| 12 | −5.849 | 4.16 | | | 14 |

-continued

| 13 | ∞       | 1.8    | 1.5251  | 58.58 | 20 |
|----|---------|--------|---------|-------|----|
| 14 | ∞       | 6.04   |         |       | 20 |
| 15 | 24.03   | 6      | 1.69661 | 53.21 | 19 |
| 16 | −18.006 | 0.1    |         |       | 19 |
| 17 | 7.501   | 7      | 1.51825 | 64.06 | 16 |
| 18 | −19.566 | 3.1062 |         |       | 16 |
| 19 | ∞       |        |         |       |    |

Data of aspherical surfaces

9th surface

K = −1
$A_4 = 7.70E-07$
$A_6 = -3.03E-08$
$A_8 = -8.89E-12$
$A_{10} = -2.92E-13$
$A_{12} = 6.45E-16$

12th surface

K = −1
$A_4 = 1.90E-04$
$A_6 = 1.30E-06$
$A_8 = 2.54E-08$
$A_{10} = -1.78E-09$
$A_{12} = -2.44E-11$

17th surface

K = −1
$A_4 = 9.44E-06$
$A_6 = -3.25E-06$
$A_8 = -1.36E-07$
$A_{10} = -5.67E-10$
$A_{12} = 2.94E-11$

EXAMPLE 3

| No | r       | d     | ne      | vd    | ED   |
|----|---------|-------|---------|-------|------|
| 0  | ∞       | 57.04 |         |       | 25.4 |
| 1  | ∞       | 3     | 1.5251  | 58.58 | 36.3 |
| 2  | ∞       | 27.3  |         |       | 36.3 |
| 3  | ∞       | 3     | 1.4731  | 66.5  | 37   |
| 4  | ∞       | 7.99  |         |       | 37   |
| 5  |         | 13    | 1.51825 | 64.06 | 38   |
| 6  |         | 0.01  |         |       | 38   |
| 7  |         | 1.5   | 1.76167 | 27.51 | 38   |
| 8  | ∞       | 20.5  |         |       | 38   |
| 9  | 16.785  | 18    | 1.51825 | 6.06  | 38   |
| 10 | −37.545 | 19.94 |         |       | 38   |
| 11 | 21.764  | 8     | 1.51825 | 64.06 | 14   |
| 12 | −5.849  | 4.16  |         |       | 14   |
| 13 | ∞       | 1.8   | 1.5251  | 58.58 |      |
| 14 | ∞       | 6.04  |         |       |      |
| 15 | 24.03   | 5.5   | 1.69661 | 53.21 | 18   |
| 16 | −18.006 | 0.1   |         |       | 18   |
| 17 | 7.501   | 6.5   | 1.51825 | 64.06 | 15   |
| 18 | −19.566 | 4.72  |         |       |      |
| 19 | ∞       |       |         |       |      |

Data of aspherical surfaces

9th surface

K = −1
$A_4 = -1.26E-06$
$A_6 = -1.60E-08$
$A_8 = -1.00E-10$
$A_{10} = 5.37E-14$
$A_{12} = 1.68E-16$

12th surface

K = −1
$A_4 = 1.90E-04$ $A_6 = 1.30E-06$
$A_8 = 2.54E-08$
$A_{10} = -1.78E-09$
$A_{12} = -2.44E-11$

17th surface

K = −1
$A_4 = 9.44E-06$
$A_6 = -3.25E-06$
$A_8 = -1.36E-07$
$A_{10} = 2.88E-10$
$A_{12} = 1.74E-11$

Figure 7:
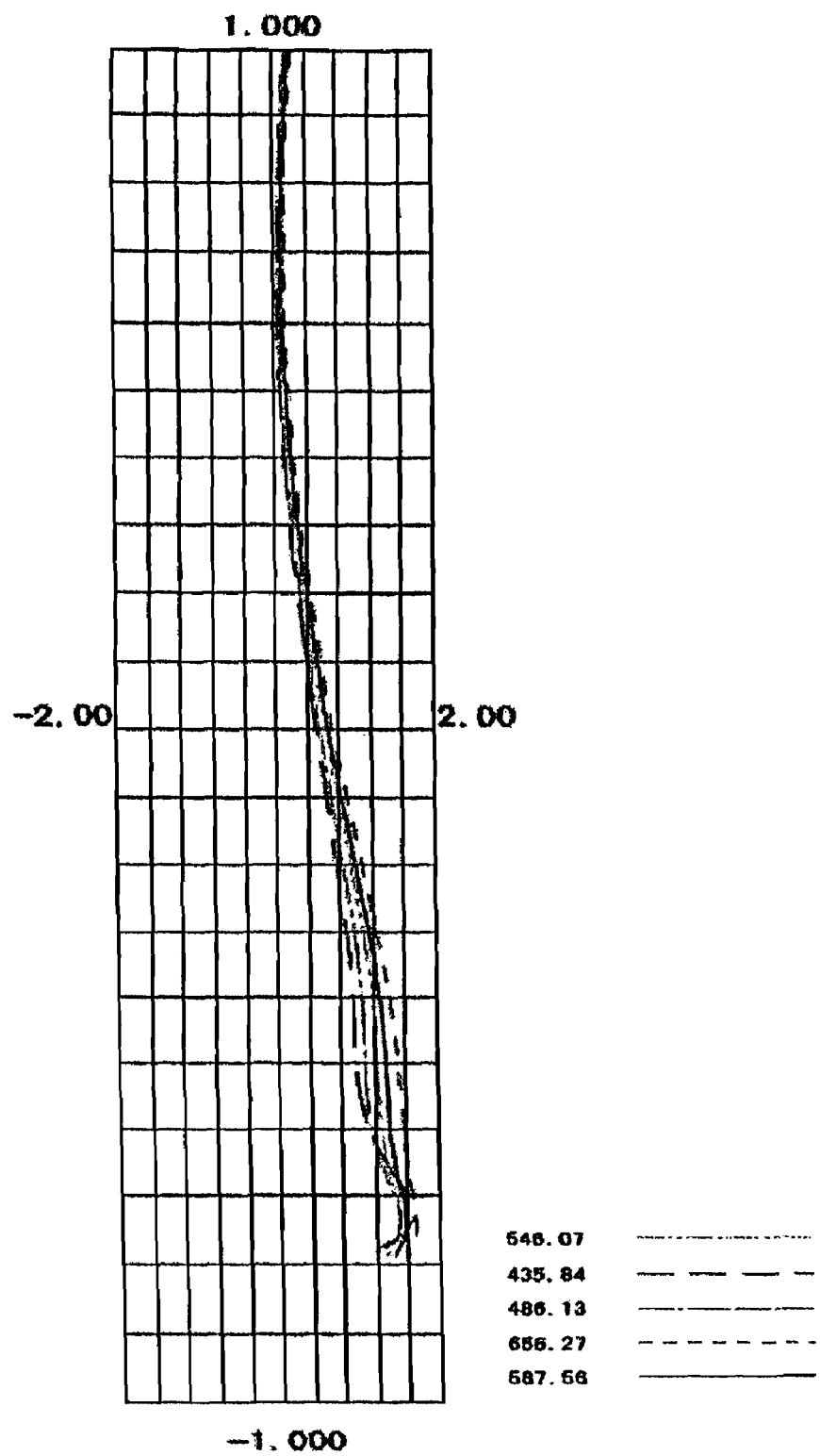
FIG. 7 is a coma diagram for Example 1 when light emanating from the light source makes an angle of 4° with the optical axis.
Figure 8:
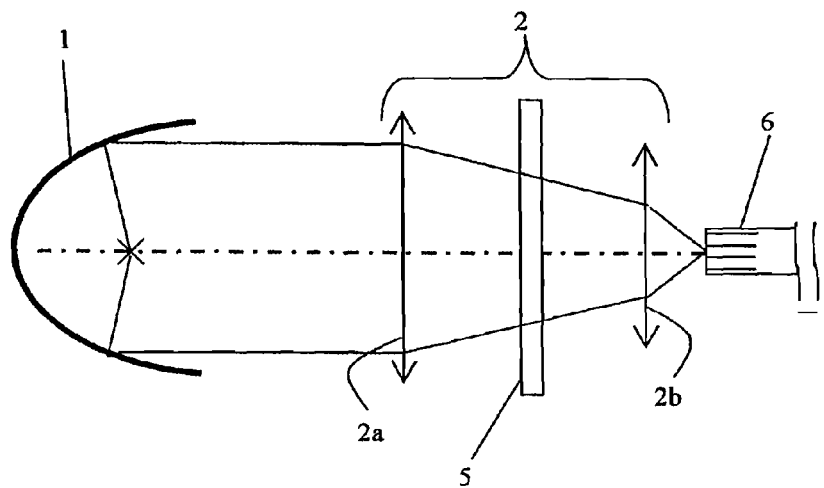
FIG. 8 is illustrative of a prior art.
Figure 9A:
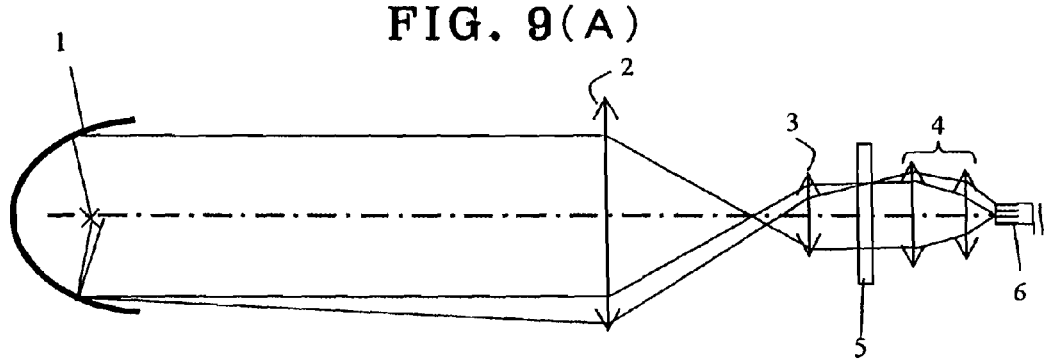
FIG. 9 is illustrative of another prior art and problems with it.
Figure 9B:
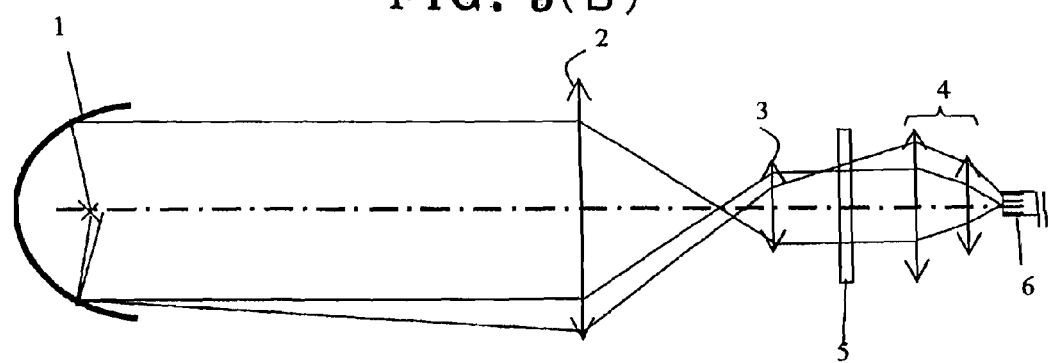
Figure 10:
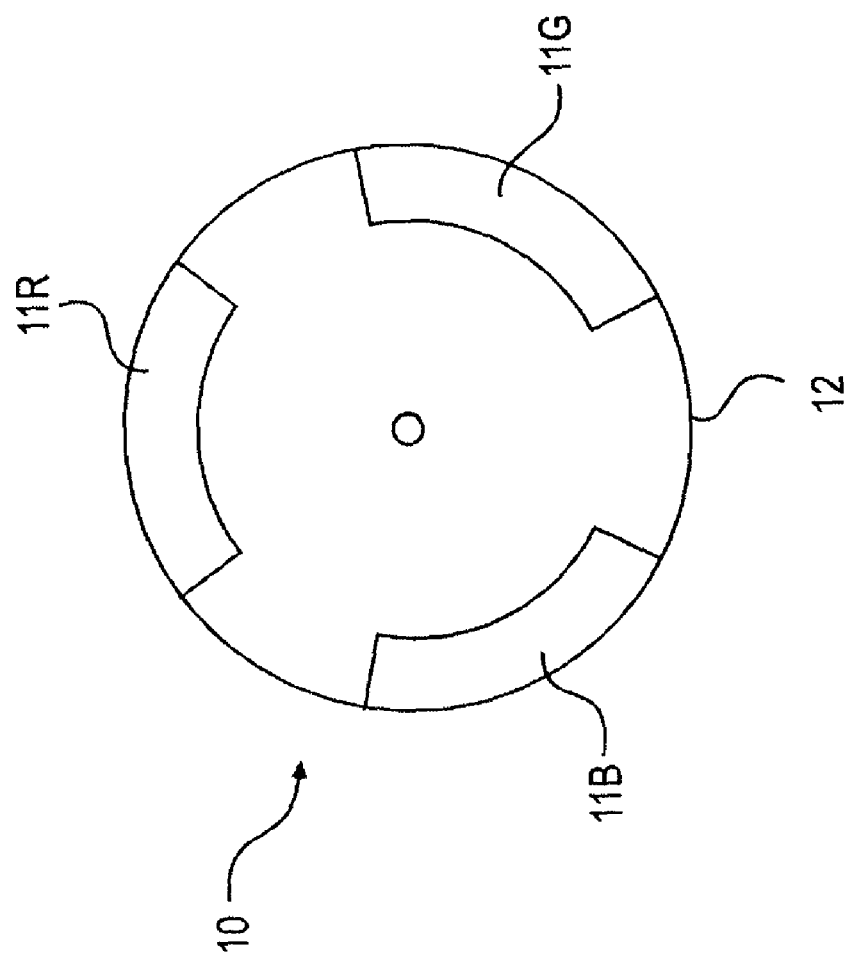
FIG. 10 is illustrative of the color wheel.

FIG. 7 is a coma diagram for the optical system of Example 1, when light emanating from the light source 1 makes an angle of 4° with the optical axis, with the numerical aperture of light rays passing on the entrance pupil as ordinate and the amount of aberrations (mm) as abscissa. If, as shown in FIG. 7, the optical system is designed such that coma has a somewhat positive value without being completely corrected, i.e., light rays gaining height on the entrance pupil are not collected on an optical system side with respect to the collection position of paraxial light rays, then off-axis light rays can efficiently be incident onto the end surface of the light guide 6 because they do not exceed the NA of the light guide. To this end, the aspheric lens is designed such that the curvature becomes weak in the effective diameter with a distance from the center of the lens.

As set out below, Examples 1 and 2 satisfy Conditions (1), (2) and (3) according to the invention.

|   |                    | Example 1 | Example 2 |
|---|--------------------|-----------|-----------|
| (1) | d                | 36.279    | 34.266    |
|   | $f_{2B} + f_{3F}$  | 37.436    | 35.576    |
|   | $d + f_{3F}$       | 46.151    | 44.138    |
| (2) | $0.5/h_4$        | 0.104     | 0.104     |
|   | $1/f_4$            | 0.136     | 0.134     |
|   | $1/x + 2/h_4$      | 0.464     | 0.462     |
| (3) | $n_{4b}$         | 1.697     | 1.697     |
|   | $n_{4i}$           | 1.518     | 1.518     |

Examples 1 and 2 also satisfy Condition (4) according to the invention, as follows.

$$\tan^{-1}\{D/(2L)\} = \tan^{-1}\{25.4/(2 \times 57.4)\} = 12.6° < 15°$$

What we claim is:

1. A light source optical system comprising, in order from a light source,
  a collective optical system for collecting light from the light source,
  a magnification conversion optical system for reducing a pupil magnification, and
  a positive lens group for collecting light from said magnification conversion optical system,
characterized by satisfying the following condition (1):

$$d < f_{2B} + f_{3F} < d + f_{3F} \tag{1}$$

where
  d is a principal point-to-point distance of said collective optical system and said magnification conversion optical system,
  $f_{2B}$ is a rear focal length of said collective optical system, and
  $f_{3F}$ is a front focal length of said magnification optical system.

2. The light source optical system according to claim 1, characterized by satisfying the following condition (2) with respect to a focal length of said positive lens group for collecting light from said magnification conversion optical system:

$$0.5/h_4 < 1/f_4 < 1/x + 2/h_4 \quad (2)$$

where
- $f_4$ is the focal length of said positive lens group,
- $h_4$ is a height of light rays at a chief plane of said positive lens group, and
- x is a principal point-to-point distance of said magnification conversion optical system and said positive lens group.

3. The light source optical system according to claim 1, characterized in that in that said positive lens group for collecting light from said magnification conversion optical system comprises at least two lenses, and satisfies the following condition (3):

$$n_{4b} \geq n_{4i} \quad (3)$$

where
- $n_{4b}$ is a refractive index of a lens located in said positive lens group and on a light source side, and
- $n_{4i}$ is a refractive index of a lens located in said positive lens group and on an exit side.

4. The light source optical system according to claim 1, and further comprising comprising an achromatic lens that is located between said light source and said collective optical system.

5. A light source optical system comprising, in order from a light source side, a collective optical system for collecting light from the light source, a magnification conversion optical system for reducing a pupil magnification, and a positive lens group for collecting light from said magnification conversion optical system, characterized in that a reflection type infrared cut filter and an absorption type infrared cut filter are interposed between said light source and said collective optical system, wherein said reflection type infrared cut filter satisfies the following condition (4), and said absorption type infrared cut filter has a surface that is perpendicular to an optical axis:

$$\theta \geq \tan^{-1}\{D/(2L)\} \quad (4)$$

where
- θ is an angle between a surface of said reflection type infrared cut filter with the direction perpendicular to the optical axis,
- D is a pupil diameter of the light source lamp that forms said light source, and
- L is a distance from a pupil position of said light source lamp up to a surface of said reflection type infrared cut filter.

6. The light source optical system according to claim 4, and further comprising a light control means for implementing light control by shading a light beam, wherein said achromatic lens inhibits colorings of a light beam on a surface on which said light control means is located.

7. The light source optical system according to claim 4, and further comprising a light control means, wherein said achromatic lens is capable of achieving a color distribution such that a color distribution of a surface on which said light control means is located cancels out a change in spectral transmission properties of a light guide caused by a change in light distribution properties due to a tight control level.

* * * * *